Dec. 10, 1935. H. I. SPRING 2,023,708
ELEVATION BEACON FOR AIRCRAFT AND THE LIKE
Filed Oct. 6, 1933
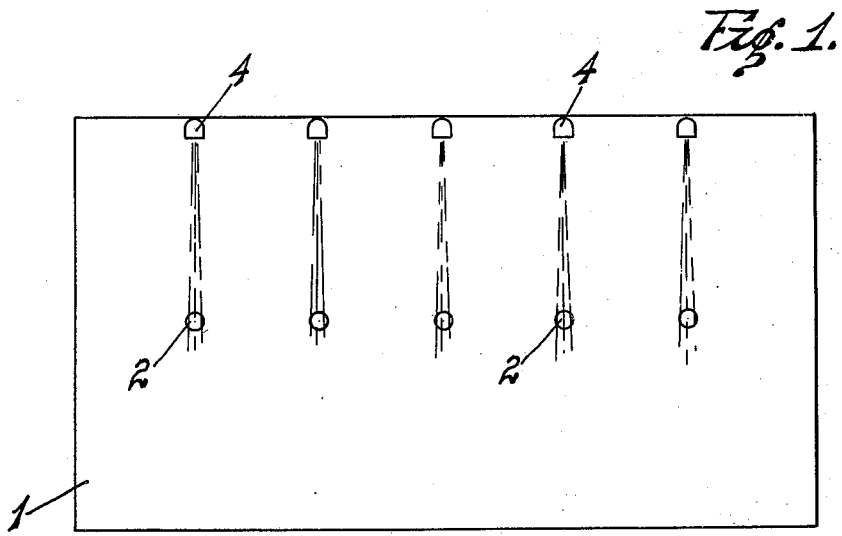
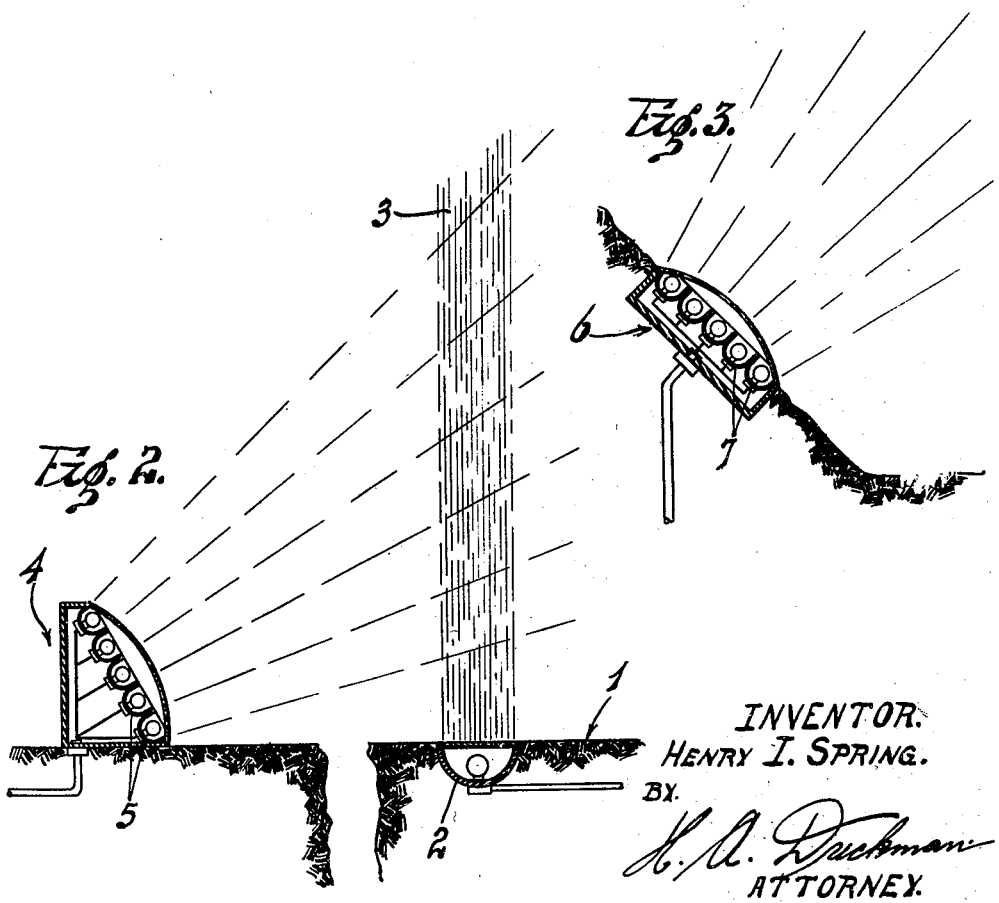
INVENTOR.
HENRY I. SPRING.
BY
ATTORNEY.

Patented Dec. 10, 1935

2,023,708

UNITED STATES PATENT OFFICE 2,023,708

ELEVATION BEACON FOR AIRCRAFT AND THE LIKE

Henry I. Spring, Long Beach, Calif.

Application October 6, 1933, Serial No. 692,445

2 Claims. (Cl. 240—1.2)

This invention relates to an elevation beacon for air-craft, and the like, whereby the pilot of the aircraft can readily ascertain the height of the plane above the ground.

My beacon is particularly applicable to landing fields, platforms, and the like.

The prime object of my invention is to provide a plurality of superimposed colored zones of light, each zone being at a known elevation from the ground.

A further object is to provide a beacon which is particularly advantageous in foggy weather; i. e., where the fog area covers the ground, the lights of my beacon being of a character to extend a considerable distance into or thru the fog belt.

Still a further object is to provide a beacon of the character stated, which can be adapted to any landing field, platform, or the like.

Other objects, advantages and features of invention may appear from the accompanying drawing, the subjoined detailed description and the appended claims.

In the drawing:

Figure 1 is a diagrammatic plan view of a landing field or platform, with my beacon arranged thereon.

Figure 2 is a transverse sectional view thru a pair of adjacent lights.

Figure 3 is a transverse sectional view of a slightly modified form of side light.

Referring more particularly to the drawing, the numeral 1 indicates a landing field or platform for aircraft, and the like.

Along the landing runway, I provide a plurality of spaced light projectors 2. These projectors are preferably set with their top surfaces flush with the surface of the ground so as not to interfere with the airplane. These projectors throw white beams of light vertically into the air. The beams are indicated at 3.

Opposite each of the projectors 2, and preferably positioned at one edge of the landing field 1, I provide a projector group 4. This projector group comprises a plurality of colored reflectors 5. The colored reflectors are so arranged that the light beams therefrom will intersect the white beams 3. The colored beams will color a zone in the white beams 3, and the pilot of the aircraft can tell from the color thru which he is passing, what the elevation from the ground is. For example, a green light might intersect the beams 3 at 900–1000 feet; a blue light, from 800–900 feet, etc. The lowest zone below 100 feet, might be red.

It is to be understood that the pilot flies the aircraft in line with the projectors 2. The aircraft is slanting downwardly at an angle, and as it cuts each of the beams 3, a distinct color will be noticeable, the particular color acquainting the pilot of his distance above the ground. I have here shown five different colored bands traversing the white beams 3, but obviously, this number may be increased or decreased, as desired.

In Fig. 3, the projector group 6 is set flush with the ground and the plurality of colored reflectors or lights 7, are mounted therein. The position of the reflectors and the use thereof, is the same as previously described.

Having described my invention, I claim:

1. An elevation beacon for aircraft and the like, comprising a plurality of projectors arranged in alignment and spaced apart in the landing runway, said projectors each throwing a vertical light beam, a projector group adjacent each of the first named projectors, each of said projector groups throwing separately and differently colored beams of light, said differently colored beams of light intersecting the white beams of light at definite elevations above the ground, the colored beams of light being identically arranged in all of the projector groups.

2. In a landing field, an elevation beacon comprising a plurality of light projectors arranged in spaced relation and in alignment in the landing runway, said projectors casting a white vertical beam of light, a projector group at the edge of the field opposite each of the first named projectors, a plurality of reflectors in each of the projector groups, each of said reflectors in a projector group throwing a differently colored beam of light, said differently colored beams intersecting the white beam of light at a known elevation above the ground, the arrangement of the colored beams of light being identical in all of the projector groups.

HENRY I. SPRING.